(12) United States Patent
Webb et al.

(10) Patent No.: US 7,396,053 B2
(45) Date of Patent: Jul. 8, 2008

(54) PIPE COUPLING COMPRISING A DIVIDED SLEEVE

(75) Inventors: Ian Richard Webb, Gerrards Cross (GB); Neil John Thornton Taylor, Rickmansworth (GB)

(73) Assignee: Taylor Kerr (Couplings) Limited, Buckinghamshire (GB)

( * ) Notice: Subject to any disclaimer, the term of this patent is extended or adjusted under 35 U.S.C. 154(b) by 91 days.

(21) Appl. No.: 10/517,735

(22) PCT Filed: Jun. 9, 2003

(86) PCT No.: PCT/GB03/02492

§ 371 (c)(1),
(2), (4) Date: Aug. 8, 2005

(87) PCT Pub. No.: WO03/104706

PCT Pub. Date: Dec. 18, 2003

(65) Prior Publication Data

US 2006/0049636 A1     Mar. 9, 2006

(30) Foreign Application Priority Data

Jun. 7, 2002  (GB)  .................................. 0213114.2

(51) Int. Cl.
*F16L 19/00* (2006.01)
*F16L 21/02* (2006.01)
*A44B 1/04* (2006.01)

(52) U.S. Cl. ........................ 285/373; 285/369; 285/111; 285/340; 285/420; 24/279

(58) Field of Classification Search ................ 285/369, 285/373, 111, 112, 340, 420; 24/279, 280, 24/281, 282
See application file for complete search history.

(56) References Cited

U.S. PATENT DOCUMENTS 1,864,339 A    6/1932  Church 4,142,743 A    3/1979  McGowen et al.
4,364,588 A   12/1982  Thompson (Continued)

FOREIGN PATENT DOCUMENTS

| CH | 676875 A5 | 3/1991 |
|---|---|---|
| DE | 34 45 807 A1 | 6/1986 |
| DE | 89 12 207.0 U1 | 2/1990 |
| EP | 0 584 784 A1 | 3/1994 |
| EP | 1 143 184 A1 | 10/2001 |
| GB | 2 249 366 A | 5/1992 |

OTHER PUBLICATIONS

International Search Report dated Sep. 4, 2003 in PCT International Application No. PCT/GB03/02492 (3 pages).
Search Report dated Aug. 19, 2003 in United Kingdom Application No. GB 0213114.2 (1 page).

*Primary Examiner*—James M Hewitt
*Assistant Examiner*—Jay R Ripley
(74) *Attorney, Agent, or Firm*—Flynn, Thiel, Boutell & Tanis, P.C.

(57) ABSTRACT

A pipe coupling (11) comprises a tubular casing (12) and a sealing gasket (13), which fit over the ends of the pipes to be coupled. The casing (12) is formed from a strip of rolled steel into a cylindrical shape, with a longitudinal gap (14). The free ends of the strip, which forms the casing, are bent outwardly to form radially projecting flange (15) along opposite edges of the longitudinal gap (14). The outer ends of the flanges (15) are bent back at right angles to form stiffening flanges (16) along the longitudinal outer edges of the flanges (15). A bridging member (18) fits inside the casing so as to span the longitudinal gap. Tensioning screw bolts (25) pass through reinforcing plate's (20) and the flange (15). A hexagonal nut (34) is threaded onto the end of each screw bolt. The nuts fit into the channel but are prevented from turning. The heads (35) of the bolts have a hexagonal recess to take an Allen key so that they can be tightened to clamp the coupling around the pipe ends.

15 Claims, 2 Drawing Sheets

U.S. PATENT DOCUMENTS

| | | | |
|---|---|---|---|
| 4,473,246 A * | 9/1984 | McDowell | 285/373 |
| 4,492,393 A | 1/1985 | Schaub | |
| 4,790,574 A * | 12/1988 | Wagner et al. | 285/419 |
| 4,795,199 A | 1/1989 | Gehring et al. | |
| 5,273,322 A | 12/1993 | Straub | |
| 6,070,914 A | 6/2000 | Schmidt | |
| 6,206,434 B1 * | 3/2001 | Schreiter | 285/104 |

\* cited by examiner

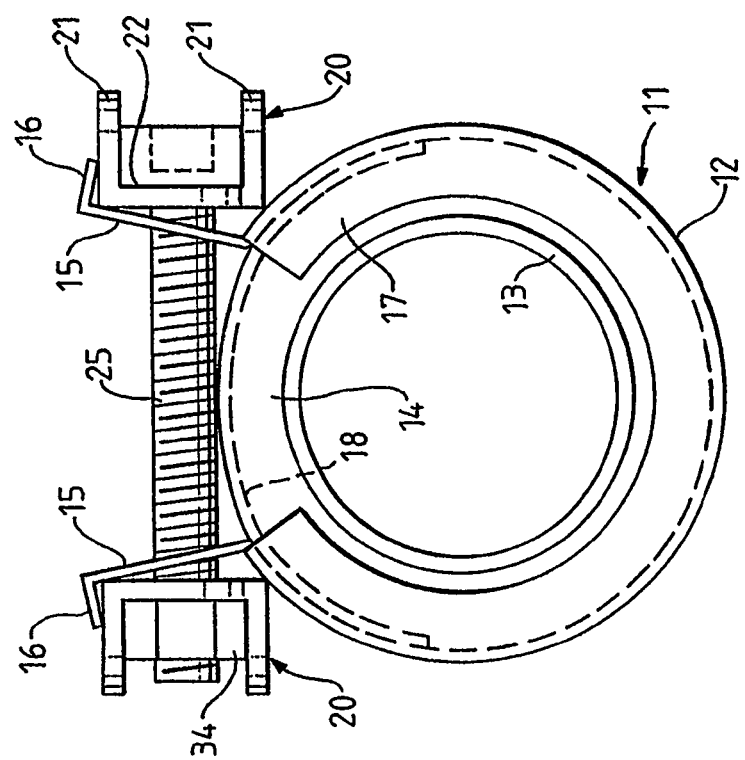
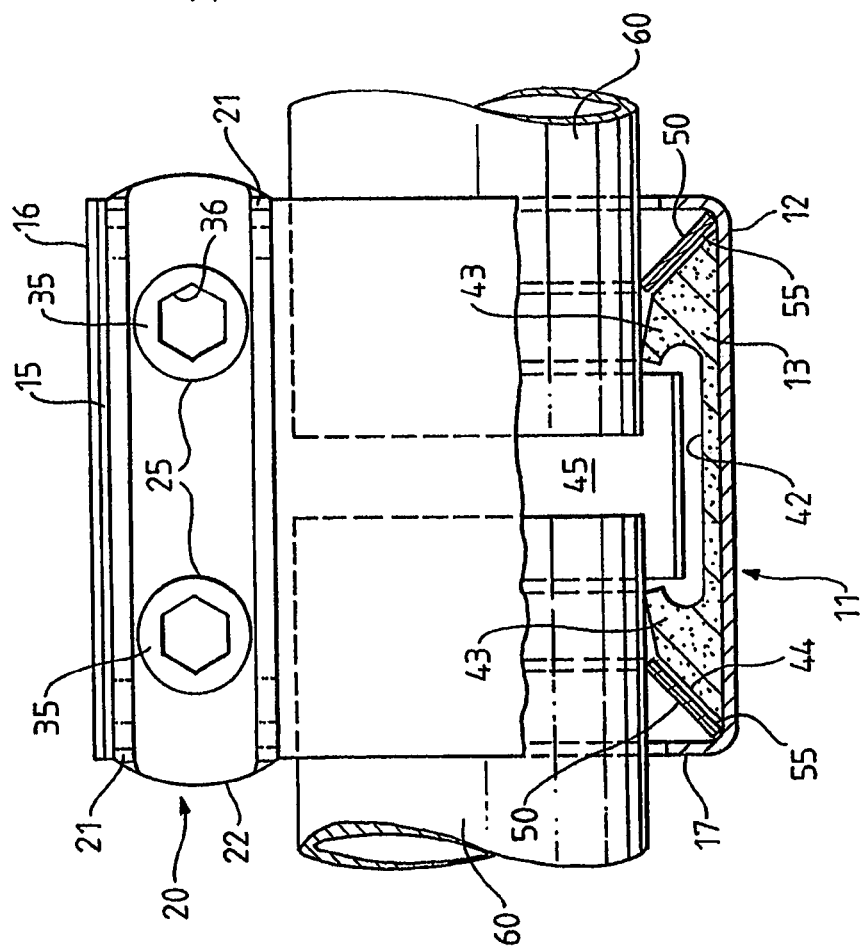
FIG. 3
FIG. 2

PIPE COUPLING COMPRISING A DIVIDED SLEEVE

BACKGROUND OF THE INVENTION

1) Field of the Invention

The present invention relates to pipe couplings for connecting together pipes in a fluid-tight manner.

2) Description of Related Art

In our earlier patent specification GB-A-2249366 we describe a pipe coupling for connecting together the ends of two plain-ended pipes in a fluid-tight manner, comprising a tubular steel casing, a tubular rubber sealing sleeve and tensioning means in the form of screw bolts for tightening the casing around the sealing sleeve. The casing has circumferential flanges projecting inwardly from its axial end. Gripping devices in the form of incomplete frustoconical rings of steel sheet are located within the casing at opposite ends of the casing. The outer edges of the gripping rings engage in the angle between the axial wall of the casing and the flanges. The inner edges of the gripping rings are formed with teeth. When the coupling is placed around the ends of two pipes to be connected and the tensioning bolts are tightened, the casing is tightened around the sealing sleeve and the gripping rings, pressing the sealing sleeve against the outer surfaces of the pipe end to form fluid-tight seals and forcing the teeth on the gripping rings to bite into the surface of the pipes to grip the pipe.

The casing is made from a strip of rolled steel formed into a tubular shape with a longitudinal gap between the free ends of the strip. The free ends of the strip are folded back on themselves and welded to form loops along opposite edges of the longitudinal gap. Pins are inserted into the loops. The tensioning bolts pass through transverse holes in one of the pins and engage in tapped transverse holes in the other of the pins so as to interconnect the two free ends of the casing. Slots are cut in the loops in the region of the transverse holes to provide clearance for the bolts to pass through. When the screw bolts are turned, the transverse pins are drawn towards each other, thus tightening the casing around the pipe ends.

The coupling of GB-A-2249366 has been successful in many fields of applications. It has been found, however, that there can be problems in manufacturing such a pipe coupling for use with pipes of small sizes, say less than 38 mm in diameter. The tensioning arrangement is too bulky for pipe couplings of this size and the coupling is impractical in many small pipe applications on account of the size of the coupling in relation to the space available in the application, the weight of the coupling, and, especially, the cost of the coupling.

There is a need for a coupling having a tensioning arrangement of a size which is reasonable in proportion to the dimensions of the pipe. The design of the coupling should be such that it can be made lighter than the existing coupling and without pins or welded ends which would make the coupling prohibitively expensive to manufacture for most applications. At the same time, the coupling must meet all the performance requirements of resisting internal pressure in the pipeline (typically up to 100 bar), withstanding vibration, withstanding axial loads, and withstanding shock without leaking, as well as being adjustable to accommodate variations in the diameters of the pipes to be joined within manufacturing tolerances. The coupling should not deform under pressure. The coupling should be capable of repeated installation and dismantling without deformation and deterioration in performance.

The specification DE-A-3445807 proposes a coupling using a single screw bolt and nut which pass through and interconnect, flanges on a tubular casing to tighten the casing. When subjected to tightening, and hydrostatic and axial loads of the kind which would be required for the applications contemplated by the present invention, the casing will deform.

BRIEF SUMMARY OF THE INVENTION

According to the present invention, there is provided a pipe coupling for connecting together the ends of two pipes, comprising a tubular casing, a tubular sealing sleeve inside the casing, and tensioning means for tightening the casing around the sealing sleeve, the arrangement being such that when the coupling is placed around the ends of two pipes to be connected and the tensioning means are tightened, the casing presses the sealing sleeve against the pipe ends to form seals, the casing comprising a strip of metal formed into a tube with a gap extending longitudinally of the casing between the free ends of the strip, the tensioning means interconnecting the free ends of the strip, characterised in that the free ends of the strip are bent outwardly to form radially projecting flanges extending longitudinally of the casing on opposite sides of the gap, the two flanges being placed between two reinforcing members, the tensioning means passing through sets of aligned holes in the reinforcing members and the flanges, the reinforcing member having an angled cross-section and extending substantially the length of the coupling.

The reinforcing members transmit the forces from the tensioning means to the flanges of the casing. The angled cross section of the reinforcing members ensures that the members have resistance to bending and that the load is spread across the length of the flanges.

With this arrangement the casing of the coupling can be formed without welding.

In the preferred embodiment, the casing has circumferentially extending end flanges projecting inwardly from the axial ends of the casing. When the coupling is fastened, the reinforcing members also prevent these circumferentially extending end flanges from lifting away from the pipe and distorting under the effects of hydrostatic pressure in the pipeline or axial load on the pipes. The reinforcing member having an angled cross-section resists bending when the tensioning means are tightened. Preferably each reinforcing member has a web portion through which the holes for the tensioning means pass, and a flange running along the longitudinal edge of the web portion that is nearer to the axis of the coupling, the flange bearing against the tubular portion of the casing.

In the preferred embodiment of the invention, the reinforcing member has a channel-shaped cross section with flanges running along both longitudinal edges of the web portion.

The frustoconical gripping rings are located within the casing at opposite ends of the casing, the inner edges of the gripping rings being formed with teeth. When the coupling is placed around the ends of the two pipes to be connected and the tensioning means are tightened, the casing forces the teeth on the gripping rings into the surfaces of the pipes to grip the pipes, thereby locking the coupling to the pipes against axial movement.

In the preferred embodiment there are two sets of aligned holes and the tensioning means comprise two screw bolts and nuts. Preferably the nuts are of a size that fits between the sides of the U-shaped member so as to prevent rotation of the nuts.

A backing ring may be provided inside the casing adjacent each gripping ring between the gripping ring and the gasket to prevent the gasket bulging between the teeth of the gripping ring.

An inner sleeve may be provided inside the sealing gasket to prevent the gasket from bulging inwardly between the pipe ends.

BRIEF DESCRIPTION OF THE DRAWINGS

An embodiment of the invention will now be described, by way of example, with reference to the accompanying drawings, of which:

FIG. 2 shows a side view, partly in section through the coupling of FIG. 1; and

FIG. 3 shows an end view of the coupling of FIG. 1.

DETAILED DESCRIPTION OF THE INVENTION

Figure 1:
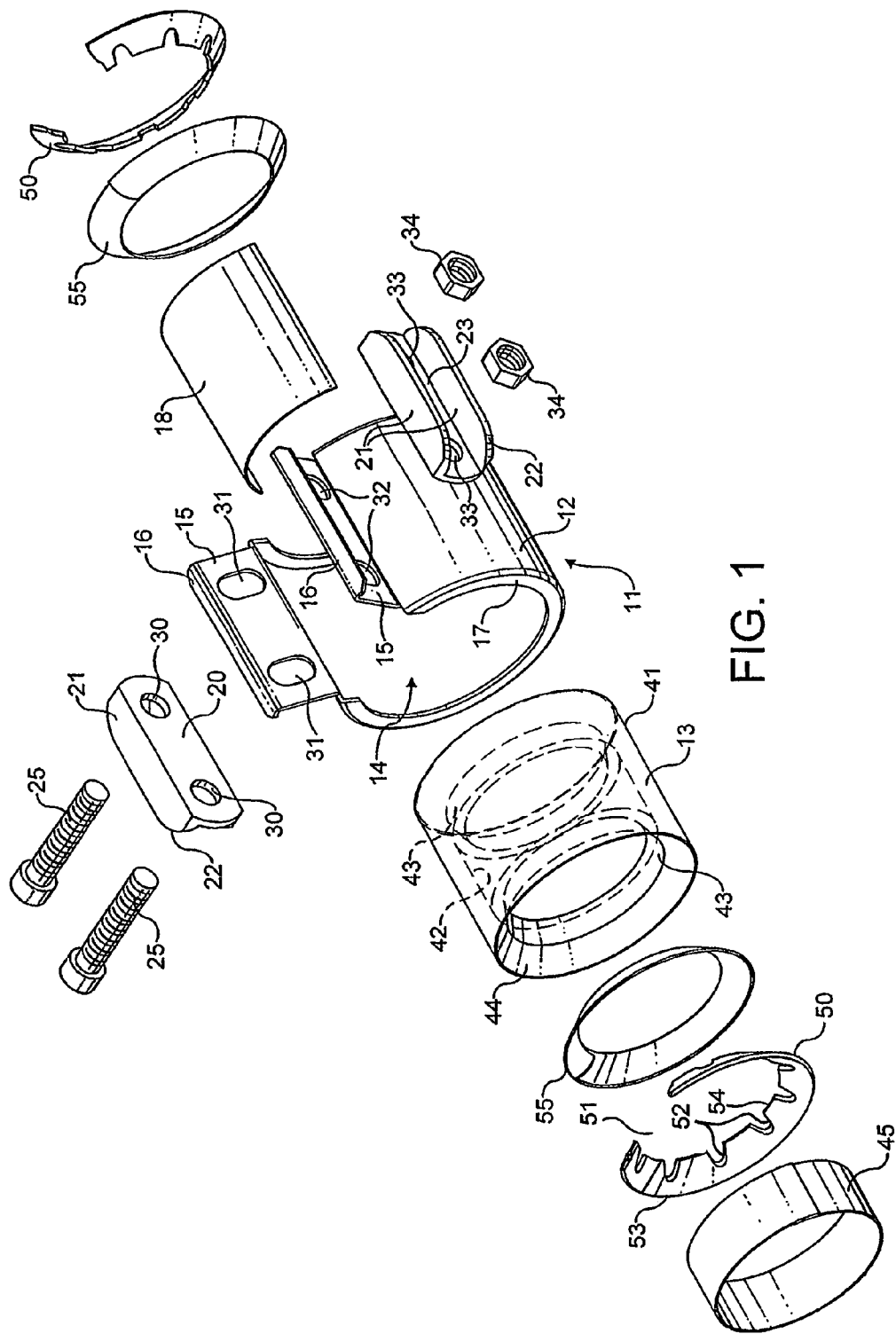
FIG. 1 shows an exploded perspective view of a coupling in accordance with the invention.

A pipe coupling 11 comprises a tubular casing 12 15 and a sealing gasket 13. The casing 12 is formed from a strip of rolled steel into a cylindrical shape, with a longitudinal gap 14. The free ends of the strip which forms the casing 12 are bent outwardly to form radially projecting flanges 15 along opposite edges of the longitudinal gap 14. The outer ends of the flanges 15 are bent back at right angles to form stiffening flanges 16 along the longitudinal outer edges of the flanges 15.

The axial ends of the casing 12 are bent inwardly at right angles to form circumferentially extending end flanges 17.

A bridging member 18 is formed from rolled steel into a part-cylindrical shape with a radius of curvature similar to that of the casing 12. The bridging member 18 fits inside the casing 12 and, in use is placed with its longitudinal edges beneath the edges of the casing that border the longitudinal gap 14 so as to span the longitudinal gap.

Two reinforcing members 20 are formed of steel with edges bent up to form a channel of U-shaped cross section. The flanges 21 which form the sides of the channel are rounded at 22 at the ends of the member.

Two tensioning screw bolts 25 pass through two sets of aligned holes 30, 31, 32 and 33 in the web portions 23 of the reinforcing plates 20 and the flanges 15. The holes 31 and 32 in the radially projecting flanges 15 are elongated in the radial direction. A hexagonal nut 34 is threaded onto the end of each screw bolt. The dimension across flats of the nuts 34 is slightly less than the internal dimension of the channel between the flanges 21 of the reinforcing member, so that the nuts fit into the channel but are prevented from turning. The heads 35 of the bolts have a hexagonal recess 36 to receive a turning tool in the form of an Allen key.

The sealing gasket 13 is of rubber formed into a 25 cylindrical tube. The outer surface 41 of the gasket is smooth and straight. The middle portion 42 of the inner surface of the gasket is also smooth and straight. Near each end of the gasket 13, the inner surface is stepped inwardly to form a sealing lip 43. The gasket 13 fits inside the casing 12.

An inner sleeve 45 is formed from a strip of rolled steel into a cylindrical shape, with its free ends overlapping. The inner sleeve 45 fits inside the smooth middle portion of the gasket 13.

The sealing gasket 13 has frustoconical end surfaces. The slope of each end surface is such that the inner end is nearer the axial middle of the gasket than the outer end.

Two gripping devices are each in the form of a frustoconical ring 50. The ring 50 is made of hard steel and is an incomplete ring having a gap 51. The inner edge 54 of the ring 50 is cut out at intervals to form teeth 52. When the coupling 11 is assembled, the gripping rings 50 fit inside the casing 12 with the outer edge 53 of the ring 50 sitting in the angle formed by the flange 17 and the cylindrical web portion of the casing.

Two backing rings 55 are each in the form of a frustoconical ring. The rings 50 are made of hard steel and the ends of the ring overlap in the manner of a spiral. The inner edges of the rings 55 are smooth. The radial thickness dimension of the rings 55 is less than the radial thickness dimension of the rings 50, so that in the assembled condition, the teeth 52 project inwardly beyond the inner edges of the rings 55.

The coupling 11 is assembled as follows. The inner sleeve 45 is inserted into the gasket 13, the resilience of the steel allowing the sleeve to be compressed so that it can be inserted past the sealing lips 43.

The bridging member 18 is placed in the casing 12 and the sealing gasket 13 is inserted into the casing 12, the resilience of the steel allowing the casing to be opened up sufficiently for the gasket 13 to be inserted past the end flanges 17. The bridging member 18 is positioned to span the longitudinal gap 14.

The backing rings 55 are inserted into the ends of the casing to abut the frustoconical end surfaces of the gasket 13. The resilience of the steel allows the rings 55 to be compressed so that they can pass the end flanges 17.

The gripping rings 50 are inserted into the ends of the casing to abut the backing rings 55. Again the resilience of the steel allows the rings 50 to be compressed to pass the end flanges.

The reinforcing members 20 are placed on opposite sides of the radial flanges 15 and the tensioning bolts 25 are inserted through the holes 30, 31, 32 and 33 in the members 20 and flanges 15 and threaded into the nuts 34. The coupling 11 now forms a sub-assembly ready for fitting in a pipeline.

In use, the ends of two plain ended pipes 60 are inserted into the coupling 11 from opposite ends as shown in FIG. 2. A space may be left between the pipe ends to allow for angular deflection, or to avoid abrasive wear, or to dampen vibration. With the coupling in place, the screw bolts 25 are tightened to clamp the coupling 11 to the pipes. As the bolts 25 are tightened, the radial flanges 15 of the casing 12 are drawn together, thereby causing the casing to apply radially compressive forces to the gasket 13 and the gripping rings 50. The bridging member 18 is arranged so as to span the longitudinal gap 14 in the casing 12. In this way the bridging member 18 supports the gasket 13 in the region of the gap 15 where there is no support from the casing 12.

The tightening of the tensioning bolts 25 presses the annular sealing lips 43 into sealing contact with the outer surfaces of the pipe ends 60. At the same time, the outer edge of the gripping ring 50 engages in the angle between the end flange 17 and the web portion of the casing 12 causing the gripping ring to be pushed inwardly. The compression of the gripping rings 50 causes the teeth 52 to bite into the surfaces of the pipes 60, thereby providing locking of the coupling 11 to the pipes against axial movement.

The backing ring 55 provides lateral support for the gasket 13 and prevents the gasket from bulging out through the gaps between the teeth 52.

The inner sleeve 45 overlaps the ends of the pipes 60 and prevents the gasket 13 from bulging into the space between the pipe ends, which may occur, particularly if pressure in the pipeline is below the outside pressure.

The coupling 11 is adjustable and one size of coupling is suitable for use with pipes of sizes that vary within the tolerance range of manufacture. The coupling 11 can be dismantled and reassembled without loss of effectiveness. The adjustable nature of the coupling 11 makes one size of coupling suitable for use with pipes of different materials but the same nominal diameter.

In couplings 11 which have flanges, there is a tendency for the casing 12 to flatten on the side of the coupling when the tensioning means are tightened.

We have found that this effect is reduced if the channel-shaped reinforcing members 20 described above are used.

A coupling 11 without the reinforcing members 20 was found to distort and burst at internal pressures of 40 bar. With the reinforcing members 20, a coupling 11 has been found to perform up to 100 bars pressure.

The invention claimed is:

1. A pipe coupling for connecting together the ends of two pipes, comprising:
    a tubular casing, having circumferentially extending end flanges projecting inwardly from axial ends of the casing;
    a tubular sealing sleeve inside the casing;
    tensioning means for tightening the casing around the sealing sleeve, said tensioning means comprising two sets of screw bolts and nuts, and frustoconical gripping rings located within the casing at opposite ends of the casing, the inner edges of the gripping rings being formed with teeth;
    the casing comprising a strip of metal formed into a tube with a gap extending longitudinally of the casing between the free ends of the strip,
    the tensioning means interconnecting the free ends of the strip, the arrangement being such that when the coupling is placed around the ends of two pipes to be connected and the tensioning means are tightened, the casing presses the sealing sleeve against the pipe ends to form seals and forces the teeth on the gripping ring to bite into the surface of the pipes to grip the pipes,
    wherein the free ends of the strip are bent outwardly to form radially projecting flanges extending longitudinally of the casing on opposite sides of the gap, the two radially projecting flanges being placed between two reinforcing members which extend substantially the length of the coupling, the tensioning means passing through two sets of aligned holes in the reinforcing members and the radially projecting flanges, the reinforcing members each having an angled cross-section, a web portion through which the holes for the tensioning means pass, and a reinforcing member flange extending along the longitudinal edge of the web portion that is nearer to the axis of the coupling, wherein each said web portion of each said reinforcing member is in surface-to-surface contact with a planar surface of a respective said radially projecting flange.

2. A pipe coupling according to claim 1 in which each said reinforcing member has a channel-shaped cross section with reinforcing member flanges extending along both longitudinal edges of the web portion, and the nuts are of a size that fits between the flanges of each said reinforcing member so as to prevent rotation of the nuts.

3. A pipe coupling according to claim 2 which is arranged so that as the bolts are tightened, the radially projecting flanges are drawn together thereby causing the casing to apply radially compressive forces to the sealing sleeve and the gripping rings.

4. A pipe coupling according to claim 1 which is arranged so that, as the bolts are tightened, the radially projecting flanges are drawn together, thereby causing the tubular casing to apply radially compressive forces to the sealing sleeve and the gripping rings.

5. A pipe coupling according to claim 1, wherein the aligned holes are elongated in the radial direction.

6. A pipe coupling according to claim 1 including backing rings provided inside the casing adjacent a respective said gripping ring between the gripping ring and the sealing sleeve to prevent the sealing sleeve from bulging between the teeth of the gripping ring.

7. A pipe coupling according to claim 1 including an inner sleeve provided inside the sealing sleeve to prevent the sealing sleeve from bulging inwardly between the pipe ends.

8. A pipe coupling according to claim 1, wherein the outer ends of the radially projecting flanges are bent back to form planar stiffening flanges along the longitudinal outer edges of the radially projecting flanges.

9. A pipe coupling according to claim 8, wherein the radially projecting flanges are bent back at right angles.

10. A pipe coupling for connecting together pipe ends, comprising:
    a tubular casing comprising a strip of metal formed into a tube with a gap extending longitudinally of the casing between free ends of the strip, the free ends of the strip being bent outwardly to form opposing spaced radially outwardly projecting flanges that extend longitudinally outwardly on opposite sides of the gap, the radially projecting flanges including through holes adjacent the free ends thereof extending therethrough, said tubular casing further comprising inwardly extending end flanges projecting inwardly at axial ends of the tube of said tubular casing;
    a hollow generally tubular sealing sleeve located inside the casing for receiving ends of pipes therein;
    frustoconical gripper rings located within and at opposite ends of the casing and having inner edges formed with teeth;
    a pair of reinforcing members separate from the tubular casing and having a length substantially the same as a longitudinal length of said projecting flanges of said tubular casing, each said reinforcing member including a web portion with through holes for placement substantially in alignment with the through holes of said respective outwardly projecting flanges when said reinforcing members contact with said projecting flanges on opposite sides of the gap, said reinforcing members each including a reinforcing member flange extending along a longitudinal edge of said web portion that is nearest to the axis of the coupling so that the longitudinal edge where said web portion and said reinforcing member flange directly adjoin bears against a region on an outer surface of said tube of said tubular casing; and
    a tensioning arrangement for placement through the aligned through holes of said web portions and said outwardly projecting flanges for interconnecting the free ends of the opposing spaced radially outwardly projecting flanges and for moving said flanges toward each other to tighten said tubular casing around said sealing sleeve,
    wherein, when the coupling is placed around the ends of two pipes to be connected and said tensioning arrangement is tightened, said tubular casing presses said sealing sleeve against pipe ends to form seals and forces the gripping rings to grip the respective pipe ends.

11. A pipe coupling according to claim 10, wherein a planar surface of said web portion of each said reinforcing member is configured for surface-to-surface contact with a planar outer surface of a respective said radially outwardly projecting flange.

12. A pipe coupling according to claim 10, said coupling further comprising a bridging member for spanning the longitudinal gap.

13. A pipe coupling according to claim 10, wherein said sealing sleeve comprises a sealing gasket having sealing lips formed near each end thereof.

14. A pipe coupling according to claim 13, including a steel inner sleeve for placement within a smooth middle portion between said sealing lips within said sealing gasket.

15. A pipe coupling for connecting together ends of two pipes, comprising:
- a tubular casing formed into a tube with a gap extending longitudinally of the casing between free ends of the strip, the free ends of the strip being bent outwardly to form opposing radially outwardly projecting substantially planar flanges that extend longitudinally outwardly on opposite sides of the gap, the radially projecting flanges including through holes adjacent the free ends thereof and extending therethrough;
- a hollow generally tubular sealing sleeve located inside said tube of said tubular casing for receiving ends of pipes therein;
- frustoconical gripping rings located within and at opposite ends of said tube of said tubular casing;
- a pair of reinforcing members dimensioned for extending along a longitudinal length of said projecting flanges of said tubular casing, each said reinforcing member including a web portion having a planar surface with through holes, said reinforcing members configured for placement substantially in alignment with the through holes of said respective outwardly projecting flanges when said web portion of each said reinforcing member is placed into surface-to-surface contact with the planar surface of a respective said projecting flange, said reinforcing members each including a reinforcing member flange extending along a longitudinal edge of the web portion that is nearest to the axis of the coupling so that at least a part of at least one of the edge of said web portion and the adjacent edge of said reinforcing member flange contact a region on an outer surface of said tubular casing; and
- a tensioning arrangement for placement through the aligned through holes of said web portions and said outwardly projecting flanges for interconnecting the free ends of the opposing radially outwardly projecting flanges and for moving said outwardly projecting flanges toward each other for tightening said tubular casing around said tubular sealing sleeve.

* * * * *